No. 12,701. PATENTED APR. 10, 1855.
J. & T. SWEENEY.
ADJUSTABLE FRICTION ROLLER.
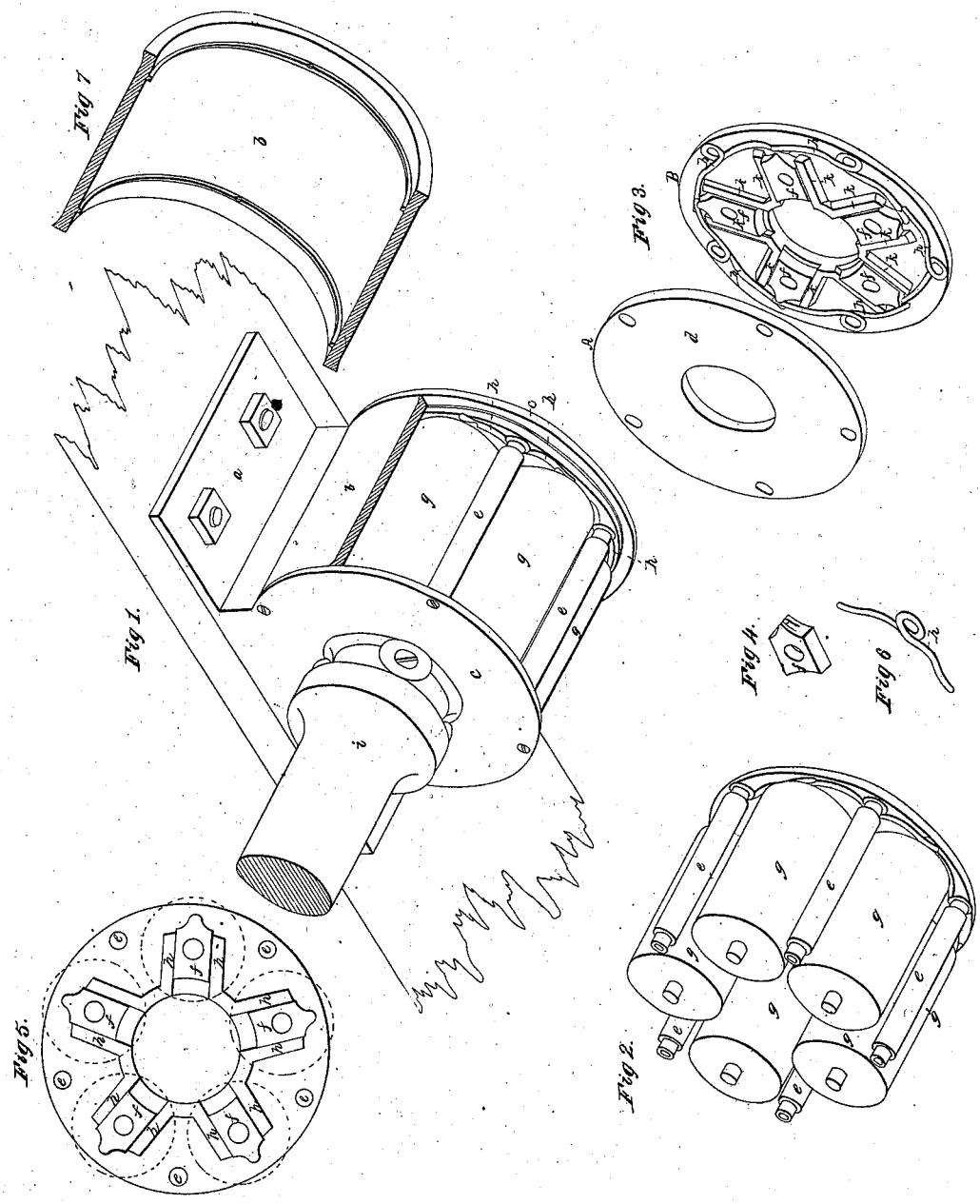

UNITED STATES PATENT OFFICE.

JOHN SWEENEY AND THOMAS SWEENEY, OF BIRMINGHAM, PENNSYLVANIA.

ADJUSTABLE FRICTION-ROLLER.

Specification of Letters Patent No. 12,701, dated April 10, 1855.

*To all whom it may concern:*

Be it known that we, JOHN SWEENEY and THOMAS SWEENEY, of Birmingham, in the county of Allegheny, State of Pennsylvania, have invented a new and useful Improvement in the Construction of Antifriction Journal-Boxes; and we do hereby declare that the following is a full and exact description thereof, reference being had to the annexed drawings, forming part of this specification, in which—

Figure 1, is a perspective view of our journal box, a portion (shown in Fig. 7) being removed to exhibit the position of the rolls, &c. Fig. 2 is a view of the rolls removed from the box, with one conductor removed. Fig. 3 represents the conductors, A showing the outer, and B the inner side with the sliding journal boxes and springs in place. Fig. 4 is one of the sliding journal boxes. Fig. 5 is a plan view of a conductor showing the sliding journal boxes in place, and by dotted lines the position of the rolls. Fig. 6 represents one of the springs.

The same letters in the several figures refer to similar parts of our journal box.

Our invention consists in attaching the antifriction rollers to their conductors, by causing the journals of the rollers to work in sliding boxes, which are continually pressed toward the journal of the shaft working between the rollers, by means of springs, thus causing all the friction rollers to press against the journal of the shaft, and insuring their all revolving on their own axis, as well as around the journal of the shaft.

Friction rollers of the ordinary construction, while they were found to possess great advantages, having scarcely any sensible friction when in motion, soon fell into disuse, owing to their great liability to get out of order, chiefly from their wearing more on one side than the other, and if the rollers stood still for a moment, the journal would wear a flat place on the two rollers beneath it, and they would never wear round again. Of course where this effect took place they soon became loose and presented a greater degree of resistance to the journal than the common box. These obstacles can be overcome by any method which will insure the continual rotation of the friction rollers around the journal at the same time that they revolve on their own axis; but the difficulty has been that the use of cog wheels, endless chains and similar contrivances for that purpose are very liable to break or otherwise get out of working order.

In the drawings $a$, is a plate of brass or iron which is bolted to the frame which supports the shaft, the journal of which is to work in the journal box. Attached to this plate is the journal box $b$, being a hollow cylinder, the inner surface of which is turned perfectly true. Both ends of this cylinder are closed by a plate of metal $c\ c$ with a circular hole in the center to allow of the admission of the journal. These end plates $c$, $c$, are attached to the cylindrical box by small screws. The upper half of the cylindrical box is represented in Fig. 1, as removed to exhibit the position and construction of the rollers, &c. Inside this box $b$, is the frame which carries the friction rollers, shown in perspective with one of the conductors removed in Fig. 2. This frame is composed of two conductors $d$, $d$, see Fig. 3, connected together by pins $e$, $e$, &c., which are placed near the circumference of the conductors and between the rollers so as not to come in contact with them. On the inner face of each conductor are flanges, $k\ k$ projecting from its surface, and forming guides or ways radiating from the center of the conductors, to receive the sliding journal boxes $f$, $f$, &c. The inner sides of each of these guides are placed exactly parallel, and are planed perfectly smooth so as to allow the journal boxes $f$, $f$, to slide with the least possible friction. The sliding journal boxes $f$, $f$, are of the shape shown in Fig. 4. Each sliding journal box has a circular hole designed to receive the journals or axes of the rollers $g$, $g$, &c., each roller having a sliding journal box at each end, which works in the guides formed by the flanges in the conductors as before described. In one end of each sliding journal box is a notch or groove $n$ (see Fig. 4), which is placed outward toward the circumference of the conductors. These grooves are designed to receive the extremities of the springs $h$, $h$, &c., which pressing inward from the circumference toward the center of the conductors, press the sliding journal boxes and with them the rollers which they carry, toward a common center.

The springs $h$, $h$, are of the shape shown in Fig. 6, being constructed of wire twisted in the center around the pins which respectively support them: each spring being kept in its place by passing around its pin in a groove in the pin close to the inner face of the conductor. There are two springs to each pin, one at each end and each extremity of every spring rests on the outer end of one of the sliding journal boxes, so that each sliding journal box is acted on by two springs, and each roller, having two sliding journal boxes is pressed up toward the journal of the shaft by four springs; this arrangement equalizes the action of the springs and the consequent pressure of the rollers. The hole in the center of the side plates of the journal box $b$, as well as the hole in the center of the conductors $d$, is larger than the diameter of the journal of the shaft $i$ (Fig. 1) which is designed to work in it, so that there may be no contact or friction of the journal $i$, against the sides of the box $b$, or conductors $d$. The rollers $g$, $g$, are of such diameter as to project within the line of the circumference of the center hole in the conductors, and to project beyond their circumference see Fig. 5. The conductors are smaller in diameter than the inside of the journal box $b$, so that when the rollers are forced out by the insertion of the journal of the shaft $i$, the circumference of the conductors $d$, $d$, does not come in contact with the inner surface of the journal box $b$, but the journal $i$, is so adjusted to the size of the rollers that when in place it forces them out so as that each roller is in contact not only with the surface of the journal $i$, but also with the inner surface of the journal box $b$. Lest there should be any friction between the outer face of the conductors and the inner surface of the side plates $c$, $c$, two flanges or wires $o$, $o$, project from the inner surface of the upper section of the box (see Fig. 7) parallel to the sides of the box, and far enough apart to allow the rollers to work between them. As the rollers in running round with their frame in the inside of the box, are continually in contact with the inner surface of the box $b$, the flanges $o$, $o$, however slightly they project will prevent the roller frame from sliding to either side and prevent its contact with the side pieces $c$, $c$. As the journal of the shaft $i$, turns around between the rollers it will cause them all to revolve as they are all, by the force of the springs, pressed up against it, and as the rollers also are in contact with the inner surface of the box $b$, they will in revolving, instead of rubbing against the box, slowly pass around the journal $i$, as their center, with their frame, which connects them together. That there may be no rubbing or sliding, but that they may pass around in the box $b$, with a rolling contact, it is desirable that these rollers should be all of the same exact diameter; and in order that if they should wear at all, as they may do, by degrees, the attrition should be uniform, so as not to impair their perfectly cylindrical form, it is desirable that the rollers should all be made of metal of the same degree of hardness. If the inner surface of the box $b$, should also wear away in any degree, this will not impair the successful operation of our rollers, because as at all times two or more of the rollers must necessarily be pressed against the inner surface of the box, the roller frame will continue to revolve, and as the rollers themselves are all, by their springs pressed against the journal shaft $i$, they will always when the journal $i$, is in motion, be revolving on their own axis, they cannot wear more at one point than another, and will have no tendency to wear flat.

The number of rollers which we use is five, but a greater or less number may be used as occasion may require.

Having thus described our improved antifriction journal box, what we claim as our invention, and desire to secure by Letters Patent is—

The use of sliding boxes to carry the journals of the friction rollers in combination with the springs for the purpose of pressing them all continually against the surface of the journals or gudgeon of the shaft which works in the rollers, so as to make them all revolve as the journal revolves not only on their own axes but around the journal in the manner hereinbefore described.

JOHN SWEENEY.
THOMAS SWEENEY.

Witnesses:
Wm. N. Howard,
B. B. Campbell.